United States Patent [19]

Pettersson et al.

[11] Patent Number: 4,988,242
[45] Date of Patent: Jan. 29, 1991

[54] CUTTING INSERT FOR CHIP FORMING MACHINING

[75] Inventors: Lars T. Pettersson, Glen Rock, N.J.; Jörgen V. Wiman, Sandviken, Sweden

[73] Assignee: Sandvik AB, Sandviken, Sweden

[21] Appl. No.: 409,944

[22] Filed: Sep. 19, 1989

[30] Foreign Application Priority Data

Sep. 22, 1988 [SE] Sweden ............................ 8803354

[51] Int. Cl.⁵ ............................................ B23P 15/28
[52] U.S. Cl. ................................. 407/114; 407/115; 407/116; 407/113
[58] Field of Search ............... 407/114, 115, 116, 113

[56] References Cited

U.S. PATENT DOCUMENTS 4,273,480 6/1981 Shirai et al. ........................ 407/114
4,846,609 7/1989 Bernadic et al. ................... 407/114

FOREIGN PATENT DOCUMENTS 3332821 5/1984 Fed. Rep. of Germany ...... 407/114

Primary Examiner—Frederick R. Schmidt
Assistant Examiner—Lawrence Cruz
Attorney, Agent, or Firm—Burns, Doane, Swecker & Mathis

[57] ABSTRACT

An insert for chip forming machining includes a polygonal body provided with a cutting edge and a chip former. The chip former comprises a plurality of ridges whereby the distance between adjacent ridges diminishes in a direction towards the middle of the cutting edge, whereby the insert cuts a conical corrugated chip which is forced away from the workpiece during machining.

10 Claims, 5 Drawing Sheets

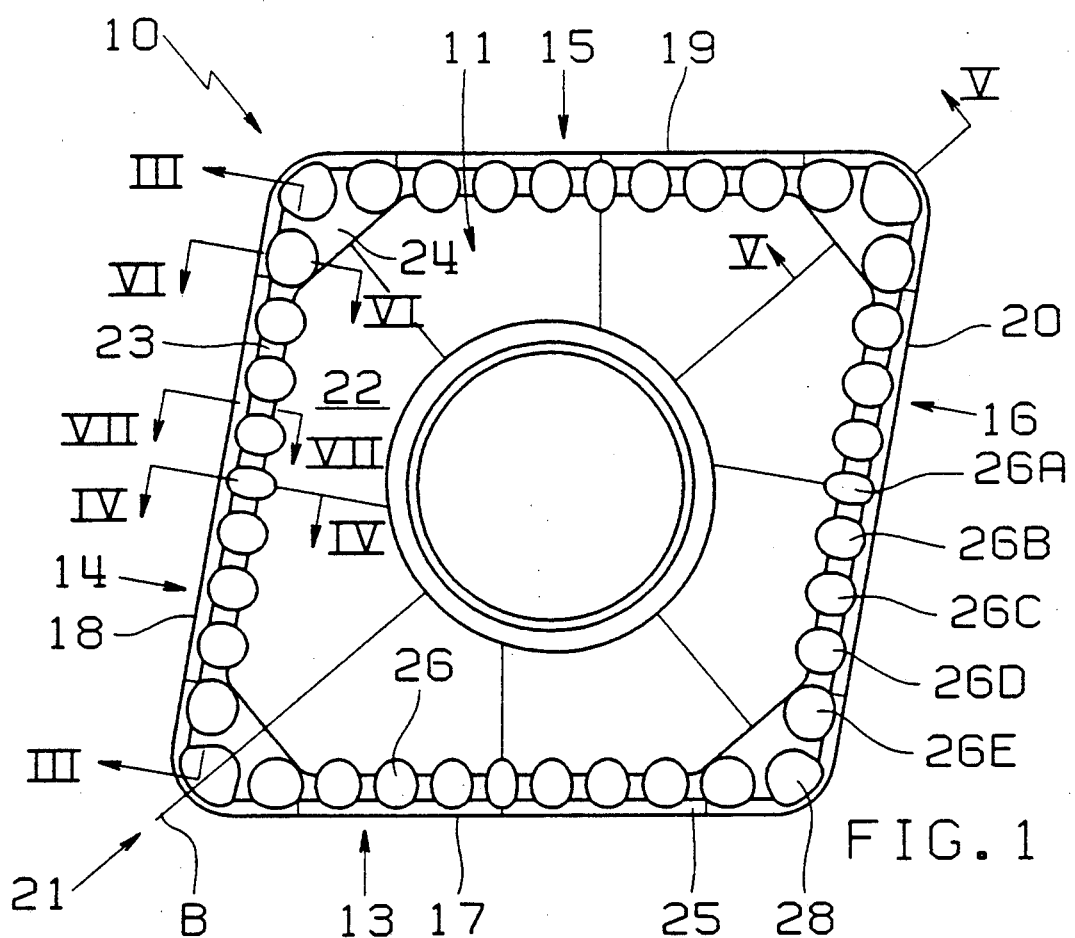
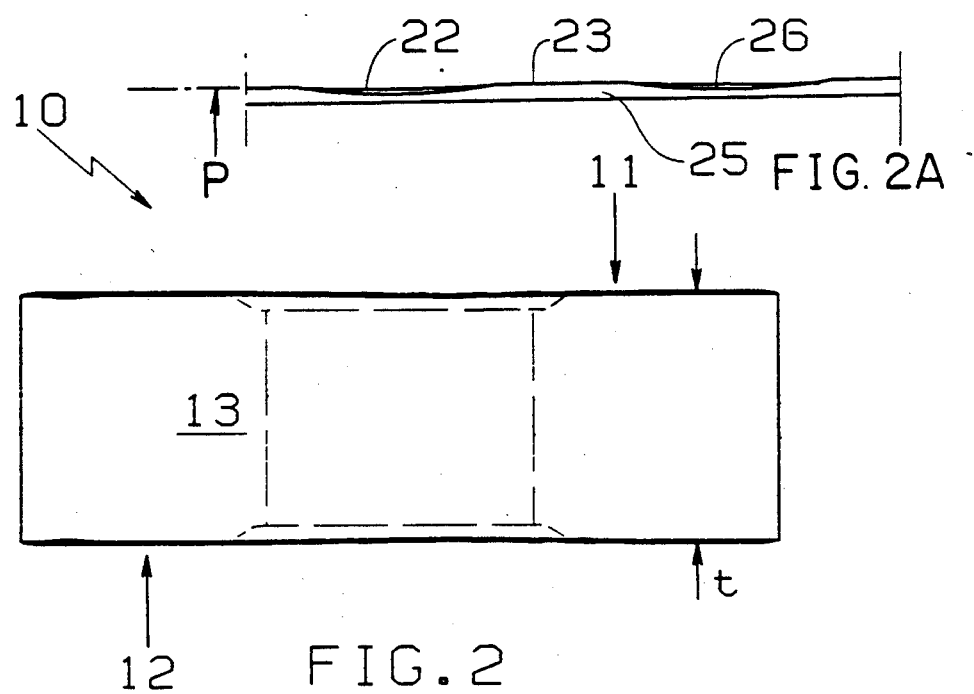
FIG. 1
FIG. 2A
FIG. 2

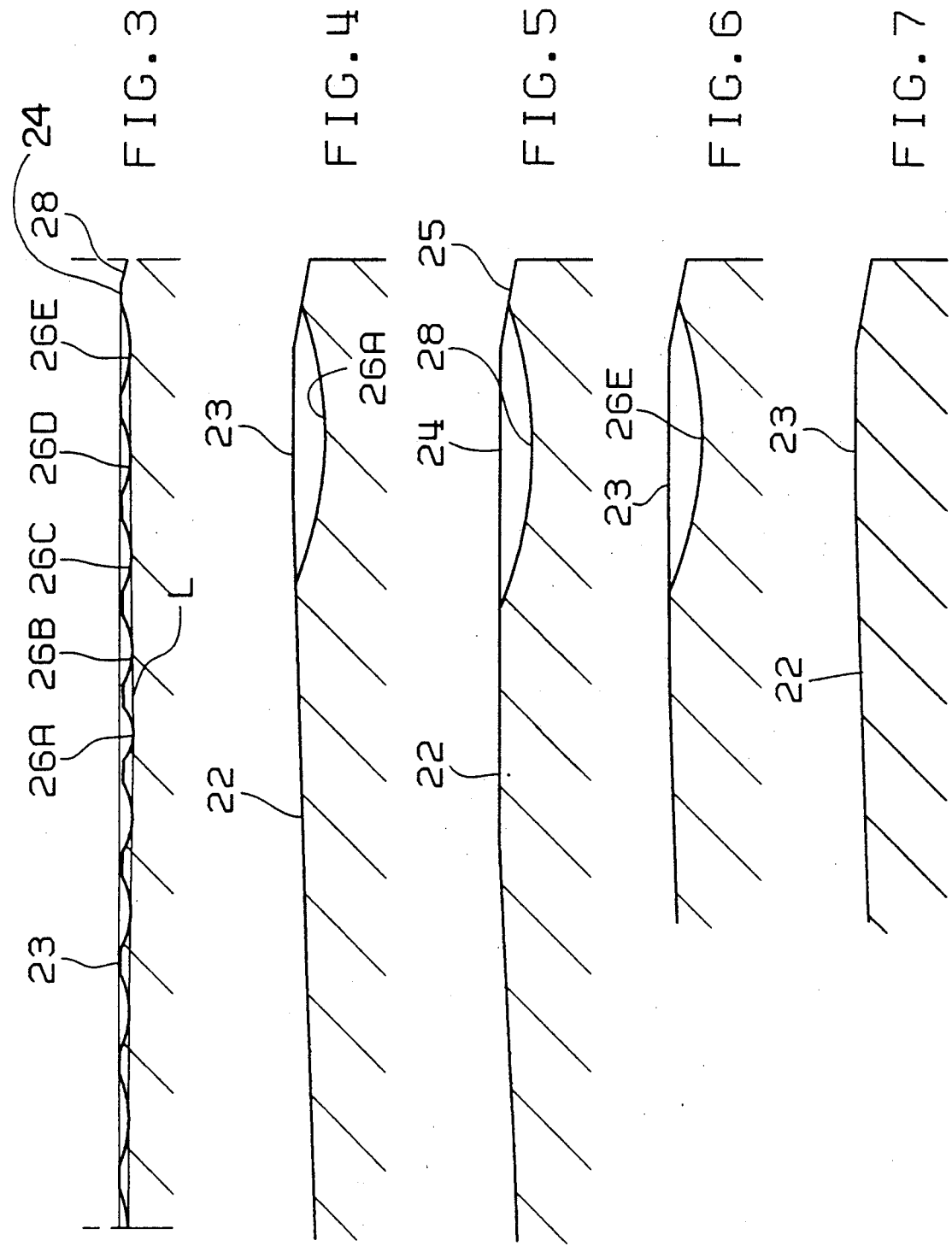

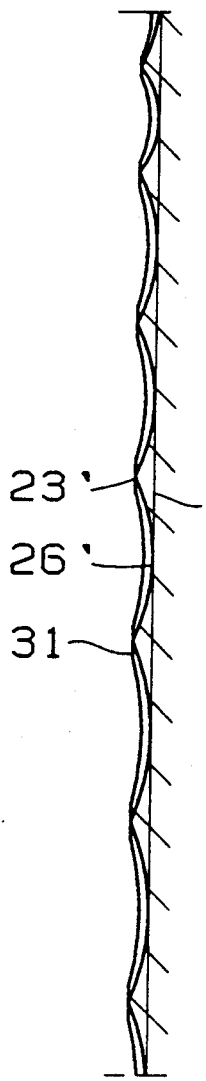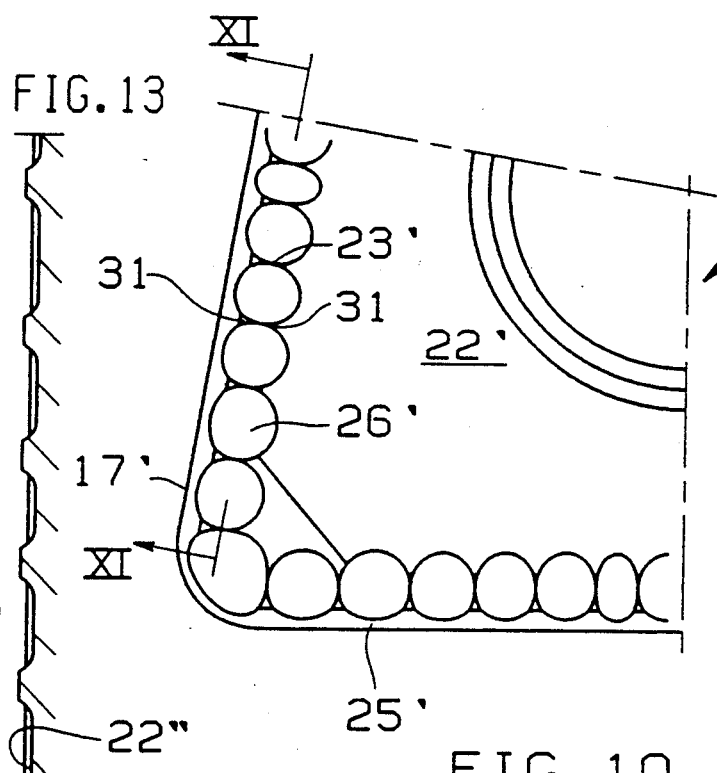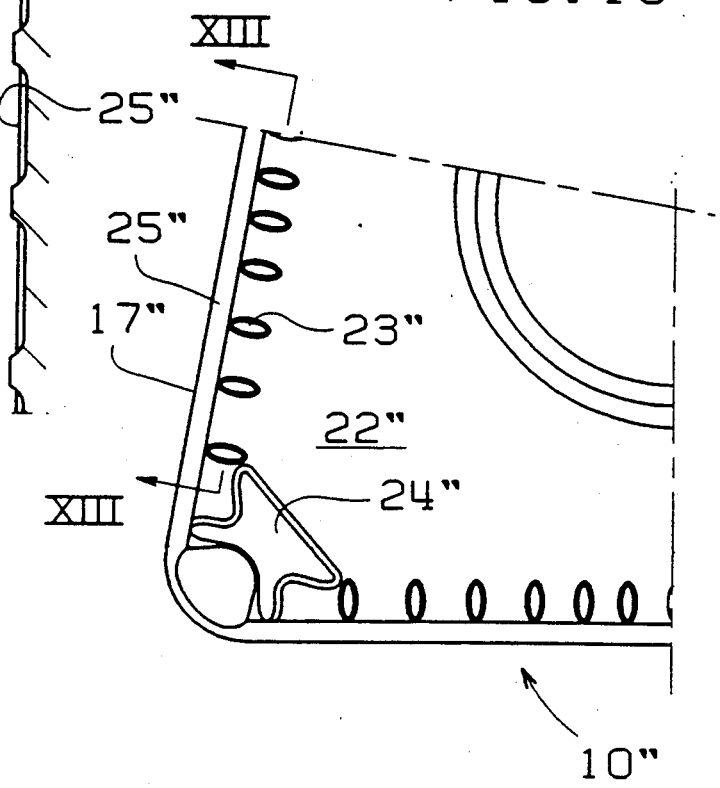

CUTTING INSERT FOR CHIP FORMING MACHINING

BACKGROUND AND OBJECTS OF THE INVENTION

The present invention relates to a cutting insert for chip forming machining comprising a body having a generally polygonal shape and at least one cutting edge created by the intersection between an upper face and a side surface of the insert. The upper face constitutes a rake face contacting the chip formed during machining. The rake face functions as a chip former and includes a plurality of ridges.

There have heretofore been proposed in the prior art inserts having chip formers that comprise a plurality of ridges spaced along the cutting edge. One of these prior inserts is provided with a chip former which includes recesses located adjacent each other in the rake face. These recesses are arranged along the cutting edge and intersect each other, whereby the lines of intersection define ridges which extend generally perpendicularly in relation to the cutting edge. The lengths of the ridges are not identical. That is, the ridges are arranged with progressively decreasing lengths, the decrease occurring in a direction from the middle of the cutting edge towards the corner of the insert, whereby the ridge adjacent the corner is shorter than the middle ridge. Chips cut by this insert exhibit a tendency to approach the workpiece during turning such that there is a risk that the chips will scratch and thus damage the workpiece.

It is an object of the present invention to provide a cutting insert which urges the chip away from the workpiece during a working operation to minimize the risk of damage to the workpiece.

It is another object of the present invention to provide such a cutting insert having a plurality of cutting edges.

SUMMARY OF THE INVENTION

The present invention is based upon a discovery that the presence of ridges which are separated by a greater distance at a location remote from the corner than adjacent the corner results in the tendency for the chips to approach the workpiece during a cutting operation.

The present invention relates to a cutting insert for chip forming machining comprising a polygonally shaped body having a rake face and a clearance surface. A cutting edge is disposed at an intersection of the rake face and a clearance surface. The rake face includes a chip forming portion extending along the cutting edge. The chip forming portion includes a plurality of ridges each extending transversely relative to the cutting edge. The distances separating adjacent ridges being non-uniform whereby such distance disposed at an end of the cutting edge is greater than such distance disposed at a middle of the cutting edge.

BRIEF DESCRIPTION OF THE DRAWINGS

The objects and advantages of the invention will become apparent from the following detailed description of preferred embodiments thereof in connection with the accompanying drawings in which like numerals designate like elements, and in which:

FIG. 1 is a top plan view of a first embodiment of a cutting insert according to the invention;

FIG. 2 is a side view of the insert of FIG. 1;

FIG. 2A is an enlargement of a portion of FIG. 2;

FIGS. 3 to 7 are cross-sectional views taken along the lines III—III to VII—VII, respectively;

FIG. 10 is a fragmentary top plan view of a second embodiment of a cutting insert according to the invention;

FIG. 11 is a cross-sectional view taken along the line XI—XI in FIG. 10;

FIG. 12 is a fragmentary top plan view of a third embodiment of a cutting insert according to the invention; and FIG. 13 is a cross-sectional view taken along the line XIII—XIII in FIG. 12.

DETAILED DESCRIPTION OF PREFERRED EMBODIMENTS OF THE INVENTION

Figure 8:
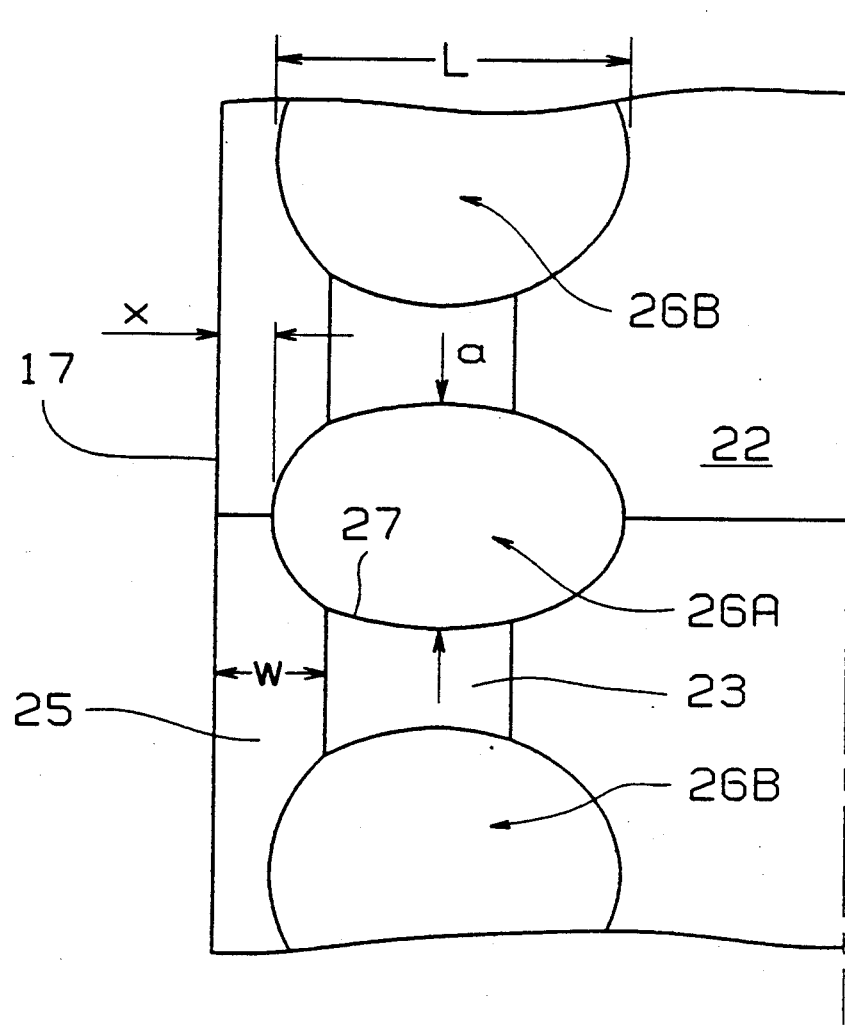
FIG. 8 is an enlarged fragmentary top plan view of the insert of FIG. 1.

In FIGS. 1-9 there is shown a double-sided cutting insert 10 according to one embodiment of the present invention. The insert is made of hard material such as ceramics, cemented carbide or similar material. When a ceramic material is selected, it is advisable to provide a negative strengthening land. The insert has a generally polygonal shape, in this case a generally rhombic shape.

The insert comprises an upper rake face 11 and a lower rake face 12 which are mainly identical in shape. These faces 11 and 12 are connected by contiguous side or clearance surfaces 13 to 16. Cutting edges 17 to 20 are created by the intersection between the upper rake face 11 and the side surfaces and between the lower rake face 12 and the side surfaces, respectively. The side surfaces 13–16 intersect one another at rounded cutting corners 21. The cutting corner 21 is bisected by an imaginary bisector B. Disposed along each cutting edge are ridges or main chip faces 23. Disposed at each corner is a corner chip face 24.

Each ridge 23 extends in a direction perpendicularly relative to the respective side surface 13–16 (as the insert is viewed in plan, see FIG. 1) and functions to upset or deform the chips during working. When a given rake face 11 or 12 is in a passive situation, i.e., when the respective face 11 or 12 faces the mounting surface of an insert holder, the corner chip faces 24 engage the mounting surface, whereas the main chip forming faces 23 are spaced therefrom. The ridges 23 and the corner chip faces 24 could alternatively be located in the same plane P, whereby the ridges 23 and corner chip faces 24 would all contact the mounting surface. When a given rake face 11 or 12 is in an active or cutting position, the corner chip faces 24, as well as the ridges 23, function to deform the chips.

The ridges 23 and the corner chip faces 24 are connected to the cutting edges 17 indirectly via a negatively beveled face 25 which extends around the insert periphery. Alternatively, the beveled face 25 could be omitted, whereby the ridges and corner chip faces would be connected directly to the cutting edges. Each of the corner chip faces 24 is symmetrical in relation to the bisector B of the respective cutting corner 21.

Each rake face 11, 12 includes a depression portion 22 which is inclined inwardly and downwardly from inner ends of the ridges 23 and corner chip faces 24. The depressed portion is not intended to contact the chips during normal cutting operations.

Adjacent ones of the ridges 23 are separated by a mainly spherically concave depression or recess 26. The deepest point of each depression in its depth direction, i.e., a direction toward the opposite rake face, is deeper than the adjacent cutting edge 17 and ridges 23. The deepest points of the depressions are arranged along a common line L (see FIG. 3) which is parallel to the adjacent cutting edge. Instead of being spherical, each depression could alternatively be cylindrical, the axis of which cylinder being either parallel or perpendicular to the respective cutting edge.

The inner and outer extensions of the ridges perpendicularly towards the adjacent cutting edge are respectively limited by their intersection with the beveled face 25 (or with the cutting edge 17-20 if no beveled face 25 is provided) and with the portion 22. The depressions 26 are designed such that the maximum distance a (see FIG. 8) between adjacent ridges progressively decreases from the cutting corner 21 towards the middle portion of the cutting edge. That is, a distance a occurring near the corner is greater than a distance a located farther from the corner. For example, a depression 26A at the middle of the cutting edge 17 (FIG. 8) has a smaller maximum width a than the adjacent depressions 26B. Furthermore, the width a of depressions 26B is smaller than the width a of depressions 26C (see FIG. 1). That relationship also applies to the depressions 26D and 26E, whereby the width a becomes progressively larger as the corner is approached. The maximum length of the depressions 26, as measured in the lateral direction (i.e., perpendicular to the width a) is identical for all.

Each of the depressions is bordered by a mainly curved edge 27 which represents the intersection between the depression 26 on the one hand and the beveled face 25, the ridge 23 and the depression portion 22 on the other hand. The edge 27 is curved (see FIG. 8), but could alternatively include only straight portions or be a combination of straight and curved portions. The depressions 26 are arranged at a constant distance x from the edge 17 as the insert is viewed in plan (see FIG. 8). The distance x is about one-half of the maximum width w of the beveled face 25 as viewed in plan (FIG. 8). The width w of the beveled face as viewed in plan is between 0.05 and 2 mm.

Each cutting corner 21 is provided with a corner depression 28 arranged symmetrically with respect to the bisector B. The corner depression 28 intersects the beveled face 25 and extends inwardly from that face. The corner depression 28 occupies about one-half of the length of the corner chip face 24 along the bisector. The largest width of the corner depression in a direction perpendicular to the bisector is larger than the largest width a of the closest depression 26E.

Figures 9, 9A, 9B:
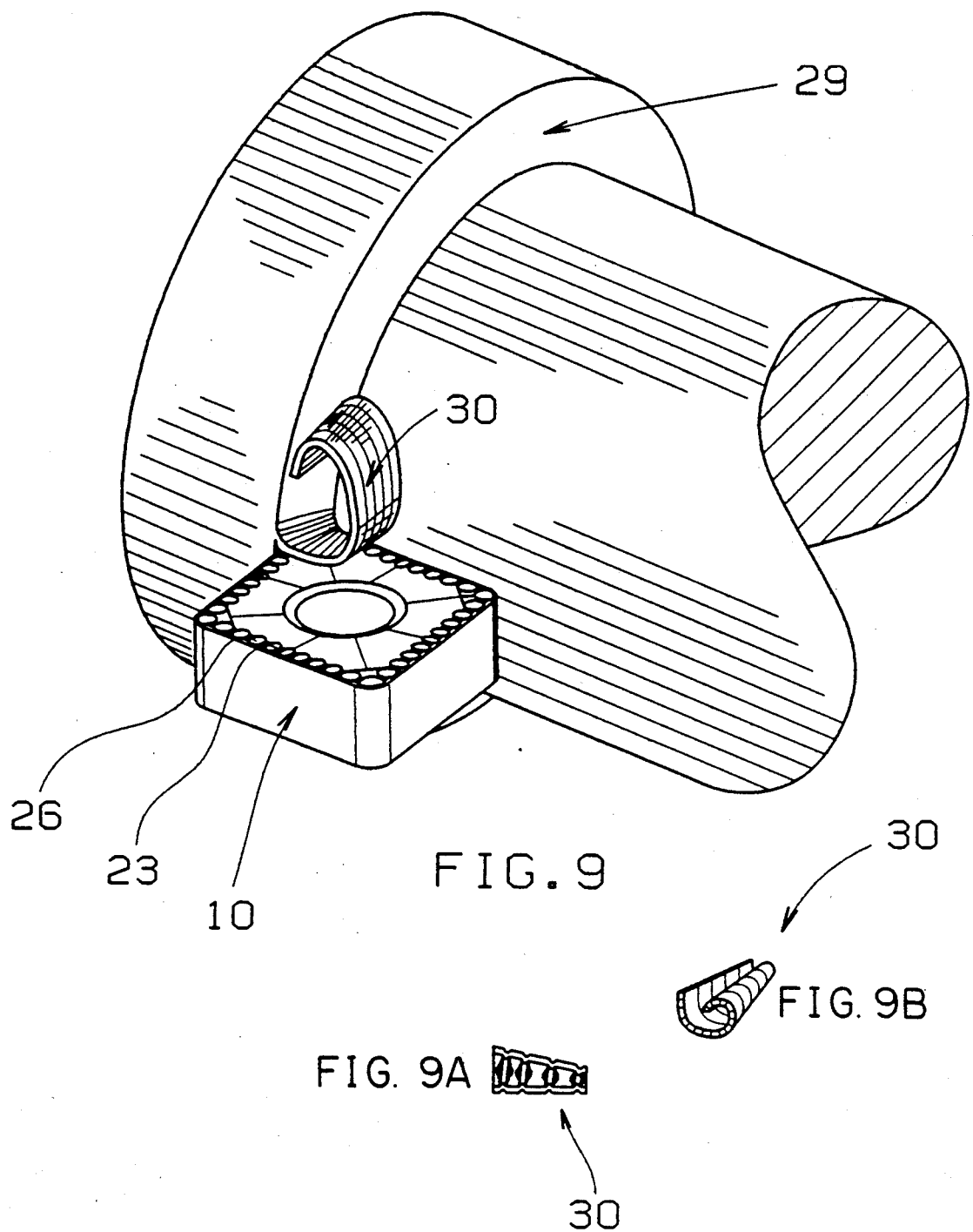
FIG. 9 is a perspective view of the insert in engagement with a workpiece.
FIG. 9A is a side view of a chip cut by a cutting insert according to the present invention.
FIG. 9B is a perspective view of the chip depicted in FIG. 9A.

FIG. 9 illustrates the insert 10 while engaged in a longitudinal turning operation upon a workpiece 29. The tool holder carrying the insert is not illustrated. When the chip is formed at the cutting edge, some portions thereof will at least partially be forced downwards into the depressions 26 whereas intervening chip portions will be subject to deformation or upsetting when abutting the ridges 23. Therefore, a corrugated chip 30 is obtained which easily can be broken and is easily manageable and non-dangerous for the workpiece and the tool. The chip is allowed to move deeper into the depression 26E located next to the active cutting corner than into the depressions located farther from the corner (due to the difference of widths a), and the radius of curvature of the chip 30 therefore becomes smallest at the corner such that the chip obtains a conical shape (see FIG. 9B). Due to this conical shape, the end of the chip which contacts the workpiece constitutes the small diameter end thereof and thereby makes only minimal contact with the workpiece. Consequently, appreciable scratching of the workpiece is avoided.

FIGS. 10 and 11 illustrate an alternative preferred embodiment of an insert 10' according to this invention. In this embodiment, the ridges 23' are defined by intersection lines between adjacent depressions 26', as well as by a generally triangular front end portion 31 extending from the front of the intersection line to the beveled face 25'. Each ridge 23' is arranged approximately perpendicularly in relation to the adjacent cutting edge 17' as the inset is viewed in plan. The front end portion 31 is intended to act as a combined support and chip face. That is, the end portions 31 will rest supportively upon the holder mounting surface, or will engage a chip, depending upon whether the respective rake face is a cutting position or a passive position. The deepest points of the depressions are arranged along a curve or a line L' disposed at an approximately constant distance from the adjacent ridges in a direction away from the corner and toward the midpoint of the cutting edge. Compared with the insert of FIGS. 1-9, there is a larger number of depressions of the same type. The insert 10' can be located on a bottom support along its entire periphery or it can be supported only at the corner areas. Preferably, the insert 10' is provided with a beveled face 25' that extends all around the insert, the beveled face extending at least from the adjacent cutting edge to the depressions 26'. The inset 10' will, in use, produce corrugated or conical chips in similarity with insert 10.

Another preferred embodiment of the insert 10" is illustrated in FIGS. 12 and 13. This insert is provided with a number of elongated ridges 23" which extend in a direction mainly perpendicular to the cutting edge 17" or beveled face 25". These ridges are surrounded by a downwardly and inwardly inclined depressions 22", the bottoms of which can be planar or concave. The ridges extending along the periphery of the insert (or possibly only the ridges disposed at the cutting corners) extend higher than the cutting edge or the beveled face, thus enabling the ridges to act as support surfaces for the insert when resting on a mounting surface of the holder. When providing such supporting surfaces only in the cutting corners, there would be provided corner ridges 24" in the form of large single ridges of a relatively large surface area.

The mutual distances between the ridges decrease from the cutting corner and towards the middle of the cutting edge 17".

The inserts described in the foregoing can be provided with a central aperture for the receipt of a clamping device such as a screw.

The invention thus provides an insert for chip cutting machining which in use forces the chips in a direction away from the insert and the workpiece and which corrugates the chips to thereby ensure cutting with good chip control to minimize damage of the workpiece.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A cutting insert for chip forming machining comprising a polygonally shaped body having a rake face and a clearance surface, a cutting edge disposed at an intersection of said rake face and said clearance surface, said rake face including a chip forming portion extending along said cutting edge, said chip forming portion including a plurality of ridges each extending transversely relative to said cutting edge, there being at least three said ridges spaced apart along said chip forming portion, said at least three ridges lying in a common plane, distances separating adjacent ones of said ridges being non-uniform whereby a distance disposed at an end of said cutting edge being greater than a distance disposed at a middle of said cutting edge.

2. Cutting insert according to claim 1, wherein said insert is double-sided, said body including identical top and bottom rake faces, said ridges of said bottom rake face adapted to support said insert on a mounting surface of an insert holder.

3. Cutting insert according to claim 1, wherein said ridges alternate with depressions along said cutting edges, said depressions extending to a depth lower than both said cutting edge and said ridges.

4. Cutting insert according to claim 3, wherein the lowest points of said depressions lie on an imaginary line disposed parallel to said cutting edge.

5. Cutting insert according to claim 1, wherein said ridges alternate with concave depressions along said cutting edge, said depressions disposed at a constant distance from said cutting edge, each depression including a curved bordering edge.

6. Cutting insert according to claim 1, wherein said insert comprises a double-sided insert, tops of said ridges defining chip deforming means when the associated rake face is in an active position in engagement with a workpiece, and defining insert supporting means for supporting said insert on a mounting surface of a holder when the associated rake face is in a supporting position in engagement with an insert holder, said ridges extending inwardly from a beveled face which intersects said clearance surface, said ridges extending rearwardly to a downwardly and inwardly inclined surface.

7. Cutting insert according to claim 6, wherein a depression located adjacent a middle of said cutting edge has a dimension parallel to said cutting edge which is less than a corresponding dimension of a depression located at a distance from said middle toward a corner of said body.

8. Cutting insert according to claim 1, wherein said ridges are defined by lines of intersection of adjacent pairs of said depressions, said ridges extending substantially perpendicularly to said cutting edge as said rake face is viewed in plan, inner ends of each ridge connected to generally triangular surface portions.

9. Cutting insert according to claim 1, wherein each ridge is bordered on its side and inner portions by a downwardly inclined surface which merges into a planar surface, said planar surfaces being coplanar.

10. Cutting insert according to claim 1, wherein said body is formed of a ceramic and includes a plurality of corners each having a depression which is symmetrical about a bisector of its respective corner, a distance between said cutting edge and an outer end of a respective depression being shorter than a distance between said cutting edge and front ends of said ridges.

* * * * *